W. E. KILLEN & E. C. PHILLIPS.
VEHICLE WHEEL.
APPLICATION FILED SEPT. 28, 1908.
930,769.
Patented Aug. 10, 1909.
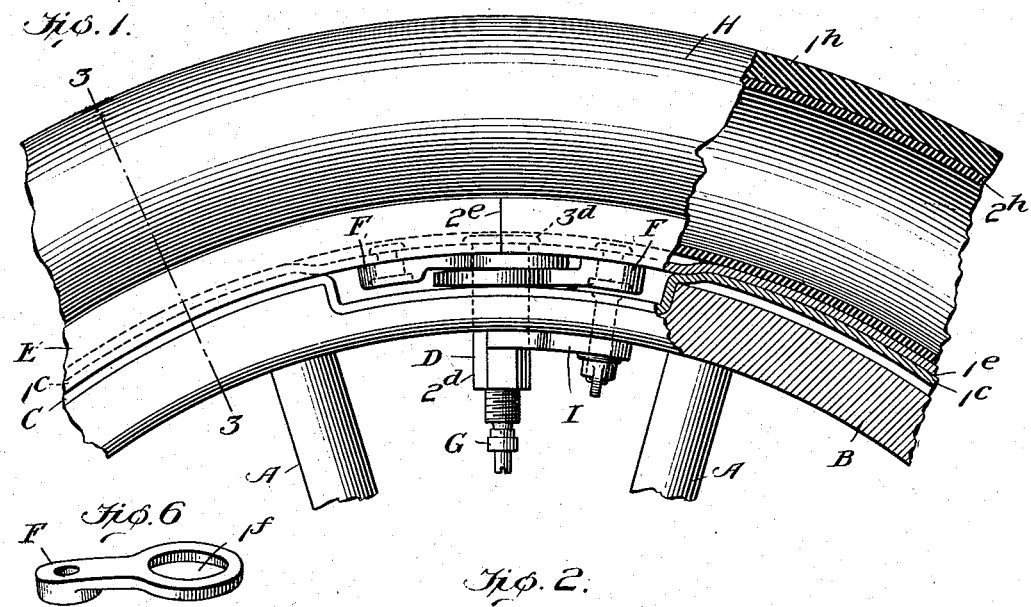
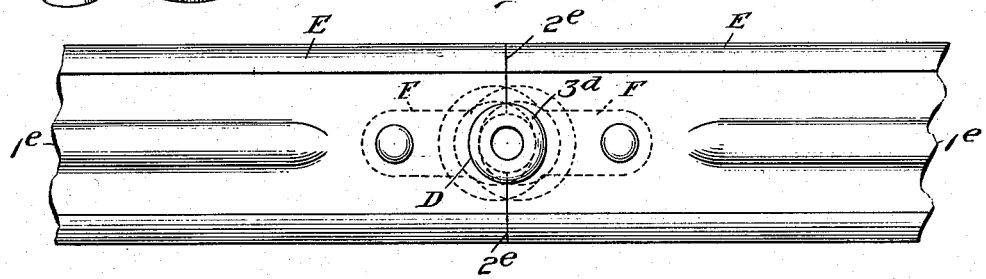
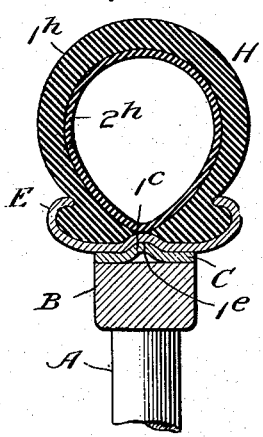
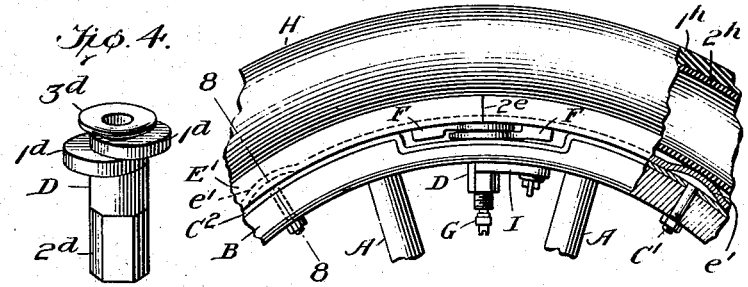
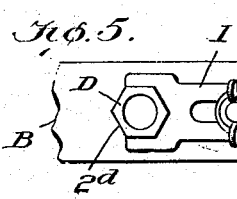
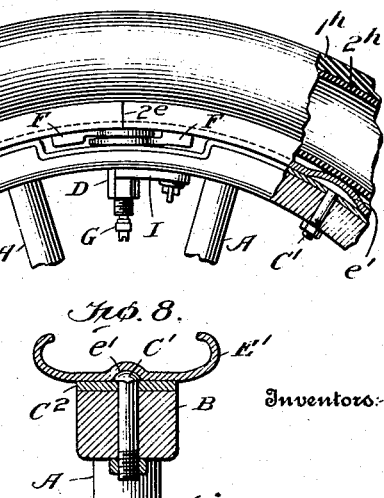
Witnesses
Edwin L. Bradford
Inventors:
William E. Killen
Elwood C. Phillips
By F. W. Ritter Jr. Attorney

UNITED STATES PATENT OFFICE.

WILLIAM E. KILLEN AND ELWOOD C. PHILLIPS, OF CHICAGO, ILLINOIS.

VEHICLE-WHEEL.

No. 930,769.  Specification of Letters Patent.  Patented Aug. 10, 1909.

Application filed September 28, 1908. Serial No. 455,049.

*To all whom it may concern:*

Be it known that we, WILLIAM E. KILLEN and ELWOOD C. PHILLIPS, citizens of the United States, residing at Chicago, in the county of Cook and State of Illinois, have invented certain new and useful Improvements in Vehicle-Wheels; and we do hereby declare the following to be a full, clear, and exact description of the invention, such as will enable others skilled in the art to which it appertains to make and use the same.

Our invention relates to the construction of vehicle wheels and particularly to the rim portion of the wheel, the object being to afford simple, secure and efficient means for removably securing the tire to the body of the wheel.

The principal feature of our invention, generally stated, embraces a wheel the felly of which is provided with means adapted to interlock with a removable rim designed to carry an inflated pneumatic tire, the removable rim being movable into and out of engagement with the interlocking devices of the felly, whereby the said rim and the tire carried thereby may be quickly and easily secured to or removed from the wheel body.

There are other, minor, features of invention residing in particular combinations and elemental constructions, all as will hereinafter more fully appear.

In the drawings chosen for the purpose of illustrating our invention, the scope whereof is pointed out in the claims, Figure 1 is a view partly in side elevation and partly in central section showing a portion of a vehicle wheel embodying our invention; Fig. 2 is a plan view of the devices illustrated in Fig. 1, the tire being removed; Fig. 3 is a transverse section of the wheel, taken in the plane of the line 3—3, Fig. 1; Fig. 4 is a detail perspective view of the eccentric member by which the removable tire carrying rim is actuated; Fig. 5 is a fragmentary view showing in inverted plan one means for locking the eccentric member in position; Fig. 6 is a detail perspective view of one of the members by which the eccentric member communicates movement to the removable rim; Fig. 7 is a view similar to Fig. 1, but illustrating another form of our invention; and Fig. 8 is a section taken in the plane of the line 8—8, Fig. 7, the interlocking devices carried by the felly being shown in elevation.

Like symbols refer to like parts wherever they occur.

We will now proceed to describe our invention more fully, so that others skilled in the art to which it appertains may apply the same.

In the drawings, A represents the spokes and B the felly of a wheel constructed in accordance with our invention. These parts of the wheel may be of any well known or suitable form, except that the felly B is appropriately cut away or otherwise fashioned to receive and permit the operation of the eccentric member D and associated devices by which the locking and unlocking movements of the removable rim are controlled.

The removable rim is secured to the wheel body by interfitting devices formed upon or carried by the rim and felly. The interlocking means carried by the felly B for coöperating with the rim E may consist of a metal band C which is secured to the periphery of the felly and which is provided with a circumferential bead or projection $1^c$ that is adapted to engage a corresponding groove or depression $1^e$ formed upon the inner circumference of the said removable rim E; or the said means may be formed as an interrupted circumferential bead consisting, for example, of tee-bolts, such as C', six or eight of which placed at equal intervals around the circumference of the wheel will be found amply sufficient.

When the construction shown in Figs. 7 and 8 of the drawings is adopted, the removable rim E having the continuous circumferential recess or channel $1^e$ may be employed if desired, but it is preferred to use a removable rim E' having on its inner circumferential face a plurality of independent sockets or recesses $e'$ which are adapted to receive and fit the heads of the bolts C'. By the use of a removable rim having independent recesses for engaging the interlocking means carried by the felly, any possible tendency for the said rim to creep circumferentially is positively overcome without throwing any strain upon the eccentric D.

If the felly B employed in connection with the bolts C' is of wood, it is desirable to reinforce the same by means of a flat metal band $C^2$ which conforms to the periphery of the felly and is conveniently secured thereto by means of the said bolts C'.

In the form of our invention illustrated in Figs. 1 to 6 of the drawings the function of reinforcing the wooden felly construction shown is performed by the interlocking member C, as will be readily apparent.

Both of the removable rims E and E', which except as otherwise described may be of the common clencher type with integral tire engaging flanges, are divided transversely, as at $2^e$, thus forming split rings the diameters of which may be increased and decreased for a purpose which will hereinafter appear. Pivotally mounted upon the inner circumferential face of each of the removable rims at points adjacent to and on opposite sides of its division line $2^e$ are yokes F which are formed with circular openings $1^f$ to receive and co-act with the corresponding cams or eccentrics $1^d$, $1^d$ borne by member D. The eccentric member D, which passes through an aperture in the felly B, is provided at its inner end with a wrench seat $2^d$ and at its outer end with an enlarged head $3^d$ which is spaced from the upper cam $1^d$ a sufficient distance to permit the ends of the removable rims to lie between said head and cam, the abutting ends of said rims E and E' at $2^e$ being formed with semi-circular recesses for this purpose. By this construction the ends of the removable rim are maintained in alinement with each other and relative movement radially, which would be likely to injure the tire, is prevented. The eccentric member D is preferably formed with a longitudinally extending cylindrical passage or bore which receives the valve stem connected to the inner tube and prevents it from creeping or being cut. The valve G, which is in threaded engagement with the eccentric member D, may be of any usual or preferred construction.

When the pneumatic tire H is inflated the friction of the several parts of the device is generally sufficient to maintain the eccentric member D in its rim locking position; but in order to certainly prevent any accidental turning of the eccentric member D when the removable rim is in place we may employ a positive locking device for this purpose. A very simple and efficient form of such a locking device consists, as shown, of a slidable slotted plate I one end of which is formed with a recess that conforms to and is adapted to engagingly span the wrench seat $2^d$ of the eccentric member D. The plate or slide is secured to the inner face of the felly B by means of a bolt which passes through the slot formed therein and which is provided with a wing nut for securing the said slide in position. By loosening the wing nut, the slide I may be moved into or out of engagement with the eccentric member D.

While we have illustrated in the drawings a clencher tire H having an outer casing $1^h$ and an inner tube $2^h$, it is to be understood that the particular form of tire is not a material feature of our invention.

The construction being substantially such as hereinbefore pointed out, the operation of the several elements of the structure will be as follows. Assume that the tire is mounted upon the removable rim in a fully inflated condition and it is desired to mount the tire and rim upon the wheel. Referring to the construction illustrated in Figs. 1 to 6 of the drawings, the eccentric member D is turned so that the eccentrics $1^d$ thereon actuate the yokes F to cause the abutting ends of the removable rim E to separate, thus increasing the diameter of said rim, after which the said eccentric member D and the attached valve G are inserted through the hole in the felly, and the rim E carrying the tire is swung into the plane of the interlocking band C and felly B. The eccentric member D is then turned a half revolution, which causes the co-acting yokes F to draw the ends of the removable rim E together, thus decreasing the diameter of said rim and causing the channel $1^e$ thereof to closely engage the corresponding bead or rib $1^c$ formed on the member C. The locking device I, when such is employed, is then secured in locking engagement with the eccentric member D, and the wheel is ready for use.

When it is desired to remove the tire H and removable rim E, the eccentric D, after having been freed from the locking slide I, is rotated a half turn to cause the expansion of the removable rim through the agency of the cams $1^d$, $1^d$ and yokes F, F, as previously explained. This expansion of the rim E enables it to be tilted or swung about its point of connection with the eccentric member D sufficiently to clear its opposite side from engagement with the circumferential bead $1^c$ upon the member C, in which position it may be entirely detached by moving it over the face of the wheel so that the eccentric member D is withdrawn from its aperture in the felly B. The attachment and removal of the removable rim shown in Figs. 7 and 8 is accomplished in a similar manner.

Having thus described our invention, what we claim and desire to secure by Letters Patent is:

1. In a vehicle wheel, the combination with the felly, of an expansible split rim having tire engaging flanges, an eccentric member having oppositely disposed cams and an enlarged head, the ends of said expansible rim extending beneath said enlarged head, and means operatively connecting said eccentric member with the ends of said rim.

2. In a vehicle wheel, the combination with the felly, of an expansible split rim having tire engaging flanges and ends recessed to receive an eccentric member, an eccentric member having two oppositely located cams and an enlarged head which is spaced above said cams and extends over the recessed ends of said rim, and yokes pivotally connected to the ends of said rim and engaging said cams.

3. In a vehicle wheel, the combination with a felly which is provided with locking devices, of an expansible rim which is provided with tire engaging flanges and with a circumferential locking groove on its inner face, said locking devices being fixed with respect to said felly and engaging said locking groove, a plurality of yokes mounted upon said rim, and an eccentric member for actuating said rim through said yokes.

4. In a vehicle wheel, the combination with the felly, of an expansible split rim having tire engaging flanges, said felly and rim having interfitting locking devices, yokes pivotally mounted on said rim, and a tubular eccentric member adapted to receive a valve stem, said eccentric member co-acting with said yokes to cause the engagement and disengagement of the interfitting locking devices of the felly and rim.

5. In a vehicle wheel, the combination with the felly, of an expansible split rim having tire engaging flanges and provided on its inner face with a circumferentially extending recess, a plurality of bolts carried by said felly, the heads of said bolts extending into the said circumferentially extending recess of the rim, yokes connected to the ends of the said expansible rim, and a rotatable eccentric having separate cams for actuating each of said yokes.

In testimony whereof we affix our signatures, in presence of two subscribing witnesses.

WILLIAM E. KILLEN.
ELWOOD C. PHILLIPS.

Witnesses:
   GEO. E. BOLTON,
   EDW. R. SCHEEF.